US012689202B2

(12) United States Patent
Whitney

(10) Patent No.: US 12,689,202 B2
(45) Date of Patent: Jul. 21, 2026

(54) BOLLARD CORD RETRACTOR

(71) Applicant: xt4, LLC, Thompson Ridge, NY (US)

(72) Inventor: Christopher S. Whitney, Montgomery, NY (US)

( * ) Notice: Subject to any disclaimer, the term of this patent is extended or adjusted under 35 U.S.C. 154(b) by 831 days.

(21) Appl. No.: 17/876,360

(22) Filed: Jul. 28, 2022

(65) Prior Publication Data

US 2023/0035958 A1     Feb. 2, 2023

Related U.S. Application Data

(60) Provisional application No. 63/203,692, filed on Jul. 28, 2021.

(51) Int. Cl.
| | |
|---|---|
| *H02G 11/02* | (2006.01) |
| *B60L 53/18* | (2019.01) |
| *B60L 53/31* | (2019.01) |

(52) U.S. Cl.
CPC .............. *H02G 11/02* (2013.01); *B60L 53/18* (2019.02); *B60L 53/31* (2019.02)

(58) Field of Classification Search
CPC .......... H02G 11/02; B60L 53/31; B60L 53/18
USPC ........................................................ 320/109
See application file for complete search history.

(56) References Cited

U.S. PATENT DOCUMENTS

| | | | | |
|---|---|---|---|---|
| 9,054,539 | B2 * | 6/2015 | Muller | B60L 53/31 |
| 9,457,674 | B2 * | 10/2016 | Bianco | B60L 53/305 |
| 11,400,822 | B2 * | 8/2022 | Krucinski | H02J 7/0042 |
| 11,495,954 | B2 * | 11/2022 | Owens | B65H 57/28 |
| 2013/0320921 | A1 * | 12/2013 | Muller | B60L 53/14 |
| | | | | 320/109 |
| 2017/0129355 | A1 * | 5/2017 | Fournier | H02J 7/00 |
| 2017/0129356 | A1 * | 5/2017 | Johnson | B60L 53/63 |
| 2017/0267114 | A1 * | 9/2017 | Bianco | B60L 53/18 |
| 2020/0369167 | A1 * | 11/2020 | Krucinski | B60L 53/16 |
| 2022/0410737 | A1 * | 12/2022 | Svedlund | B66D 3/02 |
| 2024/0010083 | A1 * | 1/2024 | Pirie | H02G 11/006 |
| 2024/0067016 | A1 * | 2/2024 | Reyes | B60L 53/67 |
| 2024/0128734 | A1 * | 4/2024 | Therrien | H02G 11/003 |

FOREIGN PATENT DOCUMENTS

| | | |
|---|---|---|
| EP | 3813212 A1 | 4/2021 |
| KR | 20190062099 A | 6/2019 |

OTHER PUBLICATIONS

International Search Report and Written Opinion, issued in corresponding International Application No. PCT/US2022/038706, mailed Nov. 2, 2022, 11 pages.

* cited by examiner

*Primary Examiner* — Suchin Parihar
(74) *Attorney, Agent, or Firm* — Verrill Dana, LLP

(57) ABSTRACT

Bollard cord retractors include a bollard having at least one hollow cavity extending through at least a portion thereof, a force retractor positioned within the hollow cavity, the force retractor including at least one of a linear force retractor or a rotational force retractor; and a retraction line attached at a first end to the force retractor and attached at a second end to a charging cord of a charger.

15 Claims, 10 Drawing Sheets

BOLLARD CORD RETRACTOR

CROSS-REFERENCE TO RELATED APPLICATION(S)

This application claims priority to U.S. Provisional Application No. 63/203,692, filed Jul. 28, 2021, entitled "BOLLARD CORD RETRACTOR," which is incorporated herein by reference in its entirety.

FIELD OF THE INVENTION

This invention relates to electric charging stations and more particularly to cord retraction devices for electric charging stations.

BACKGROUND OF THE INVENTION

Electric vehicle charging stations are high-powered electric dispensing devices. Referring now to the prior art charging station 100 depicted in FIG. 1A, generally, charging stations 100 use electric cables (cords) 101 to connect the charger to the car for a charging session. Such cords are often quite long (sometimes 20 to 25 feet or more). Additionally, the cords must be substantial enough to carry the power required to rapidly charge a car. Due to this length and size of the cord, the cords can be rather heavy and cumbersome for a user to move around into position to charge an electric vehicle and also when the cord is returned to the charger upon completion of the charging session. Accordingly, if the charger is not equipped with some sort of cord retraction or cord management system, then oftentimes the cord can be left lying on the ground as shown in FIGS. 1A and 2A.

Conventional Cord Management

Referring now to FIG. 1B, in some instances a hook 103 or similar device is provided so that the charge cord 101 can be looped or coiled and placed on the hook 103 after each use. This, in theory, can keep the cord 101 off the ground. However, due to the length and weight of the cords 101, users often choose not to exert themselves and leave the cord 101 on the ground. Furthermore, as the cords become dirty, they are progressively less likely to be picked up and handled by people and put back onto any hook or coiled storage method, further increasing the instances of the cord being left on the ground Cords that drape on the ground and/or protrude out away from the charger pose significant risks. For example, such cords can get caught around a vehicle component or snagged by a snowplow, resulting in cutting or pulling of the cord. Such cutting or pulling can cause significant damage, ranging from removing portions of the protective, electrically insulating covering of the cord to severing the cable to even separating the charger cord from the charger, which typically also causes significant damage to the charger and site. More generally, cords that come in contact with the ground wear out more quickly.

Such damage is undesirable primarily due to the risk of electrical shock to users associated with damaged equipment. In addition, repairing such damage is expensive. Such long, large, high-power electrical cords are expensive and thus the material cost is high. Further, to replace a charger cord either requires a licensed electrician trained in the operation, repair and safety of high-powered chargers to replace the cord in the field, or the charger needs to be disconnected from the installation site and shipped to a repair facility with personnel that are properly trained to repair the equipment. The first scenario is typically used if there is no damage to the charger, the second if the charger also needs repair. Regardless, both solutions are extremely expensive.

In some instances, to minimize the possibility of cord damage, a cord retraction device is used. Cord retraction or cord management systems as they are sometimes referred to, not only help the operator manage the weight of the charging cord when charging a car but also help keep the cables off the ground during charging and also when not in use. This keeps the cord cleaner by minimizing contact with the ground, dirt, grit, and moisture, which decreases premature wear of the outer protective shell. Cord retractors also keep the cord managed and out of harm's way from vehicle or snowplow snags. Such cord retractors have been a popular solution and seem to be gaining more in popularity. As shown in FIGS. 2A-2C, functionally, a cord retractor 200, 200a should allow the charge cord 101 to be deployed to charge the vehicle as shown in FIG. 2C and then the cord retractor 200 should apply a retraction force (indicated by an arrow in FIGS. 2A-2C) to pull the cord to its resting/non-charging/stowed position upon completion of the charging. As best shown in FIG. 2C, a retractor line 203 generally connects the retractor to the charge cord for the cord after use.

Two common ways of generating the required force to facilitate retraction of the cord include linear force retractors (FIG. 2A) 200 such as, for example, counterweights or counterweights with pulleys, and rotational force retractors (FIG. 2B) 200a such as, for example, a spring coiler system. Some retractors 200, 200a also include an automated or powered system.

At a minimum, when fully retracted, the charger cord should drape at a height sufficient to provide clearance between the draped cord and the ground. In general, the height of the cord retractor determines the height of the cord above the ground when fully retracted. In some instances, setting the drape height with a higher ground clearance may also render the cord generally easier to operate, reducing the effort required to pull the cord out to into the extended position for charging as well as the ease of returning the cord to the charger after use.

Unfortunately, such cord retractors conventionally are either integrates with the charging station or consist of cantilevered add-ons to the charging station (e.g., bolted on components). Such configurations are disadvantageous for a number of reasons. First, such cord retractors are limited by the height and structural characteristics of the charging station, which limits the length of charging cord that can be properly retracted, which, in turn, limits the length of cord that can be used while still achieving proper ground clearance. Additionally, such cord retractors can be expensive, unsightly, and complicate installation and removal (e.g. for replacement or repair) of the charging station. Where multiple charging cords are being used in connection with a single charger, such cord retractors, being positioned so closely together, can contribute to unnecessarily complicated cord layouts and tangling, both with protective bollards and with other cords.

Conventional Bollards

Referring now to FIGS. 3A-3B and 4A-4B, to protect the equipment and users, EV charging stations 100 are typically protected by physical barriers known as bollards 300. Bollards are conventionally short, sturdy vertical or horseshoe shaped posts designed to withstand impact from an oncoming vehicle so as to protect an object or building positioned behind or within the bollards 300. For example, as shown in FIGS. 3A, 4A, and 4B, bollards 300 can generally be installed in front of and slightly to the side of the charging station in order to block oncoming vehicles at likely approach angles, whether the charger includes a cord retractor 200 or not.

In some cases, the charger can be installed on an island or median 350 dividing parking areas. For example, as shown in FIG. 3B, chargers 100 can be installed in a median 350 surrounded by four (4) parking spaces and surrounded by four (4) bollards 300 in order to permit multi-directional access to the charger while protecting it from oncoming traffic or other dangers.

SUMMARY OF THE INVENTION

Provided herein are bollard cord retractors for retracting and managing charging cords of electrical charging stations.

In one aspect, a bollard cord retractor is provided. The bollard cord retractor includes a bollard having a hollow cavity extending through at least a portion thereof. The bollard cord retractor also includes a force retractor positioned within the hollow cavity. The force retractor includes at least one of a linear force retractor or a rotational force retractor. The bollard cord retractor also includes a retraction line attached at a first end to the force retractor and attached at a second end to a charging cord of a charger.

In some embodiments, the bollard cord retractor also includes at least one pulley configured to redirect a force exerted on the retraction line by the force retractor. In some embodiments, the force retractor is a linear force retractor. In some embodiments, the linear force retractor includes a counterweight configured to slide vertically within the hollow cavity, the retraction line attached at the first end to the counterweight. In some embodiments, the force retractor is a rotational force retractor. In some embodiments, the rotational force retractor includes a spring coiler system.

In another aspect, a charging system is provided. The charging system includes an electric charging station having a charging cord. The charging system also includes a bollard cord retractor. The bollard cord retractor includes a bollard positioned proximate and spaced apart from the electric charging station, the bollard having a hollow cavity extending through at least a portion thereof. The bollard cord retractor also includes a force retractor positioned within the hollow cavity, the force retractor including at least one of a linear force retractor or a rotational force retractor. The bollard cord retractor also includes a retraction line attached at a first end to the force retractor and attached at a second end to the charging cord of the electric charging station.

In some embodiments, the bollard is at least one of a single vertical column bollard, a horseshoe bollard, a T bollard, or an upside-down L bollard. In some embodiments, the bollard is taller than the electric charging station. In some embodiments, the charging system also includes at least one additional charging cord of the electric charging station. In some embodiments, the charging system also includes at least one additional bollard cord retractor. In some embodiments, each of the at least one additional bollard cord retractors includes an additional bollard positioned proximate and spaced apart from the electric charging station, the additional bollard having an additional hollow cavity extending through at least a portion thereof. In some embodiments, each of the at least one additional bollard cord retractors also includes an additional force retractor positioned within the additional hollow cavity, the additional force retractor including at least one of a linear force retractor or a rotational force retractor. In some embodiments, each of the at least one additional bollard cord retractors also includes an additional retraction line attached at a first end to the additional force retractor and attached at a second end to the additional charging cord of the electric charging station.

In some embodiments, the charging system also includes at least one additional charging cord of the electric charging station. In some embodiments, the bollard cord retractor also includes an additional force retractor positioned within the hollow cavity, the additional force retractor including at least one of a linear force retractor or a rotational force retractor. In some embodiments, the bollard cord retractor also includes an additional retraction line attached at a first end to the additional force retractor and attached at a second end to the additional charging cord of the electric charging station. In some embodiments, the charging system also includes at least one pulley positioned inside the hollow cavity to redirect a force exerted on the retraction line by the force retractor. In some embodiments, the charging system also includes at least one additional pulley positioned inside the hollow cavity to redirect a force exerted on the additional retraction line by the additional force retractor. In some embodiments, the force retractor includes a counterweight configured to slide vertically within the hollow cavity, the retraction line attached at the first end to the counterweight. In some embodiments, the additional force retractor includes an additional counterweight configured to slide vertically within the hollow cavity, the additional retraction line attached at the first end to the additional counterweight. In some embodiments, the counterweight and the additional counterweight are positioned in the hollow cavity in a same vertical column of the bollard. In some embodiments, the bollard is at least one of a single vertical column bollard, a T bollard, a horseshoe bollard, or an upside-down L bollard. In some embodiments, the bollard is a horseshoe bollard having a first vertical column, a second vertical column, and a horizontal cross-bar. In some embodiments, the counterweight is positioned in the hollow cavity in the first vertical column. In some embodiments, the additional counterweight is positioned in the hollow cavity in the second vertical column. In some embodiments, the retraction line extends from the counterweight through the first vertical column, over the pulley, at least partially through the horizontal cross-bar, and through a wall of the horizontal cross-bar to attach to the charging cord between the first and second vertical columns. In some embodiments, the additional retraction line extends from the additional counterweight through the second vertical column, over the additional pulley, at least partially through the horizontal cross-bar, and through the wall of the horizontal cross-bar to attach to the additional charging cord between the first and second vertical columns.

DETAILED DESCRIPTION OF THE INVENTION

Provided herein are bollard cord retractors in accordance with various embodiments. The bollard cord retractors can generally include a cord retractor installed on or within a bollard positioned proximate to a charging station for protection of the charging station and configured to retract a charging cord of the charging station.

Bollard Cord Retractor

Figure 1A:
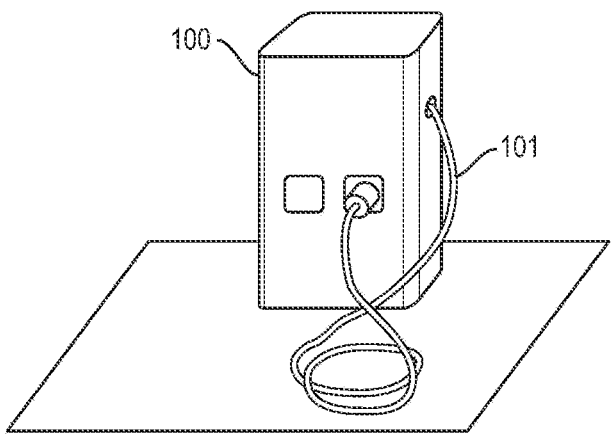
FIG. 1A is a perspective view of a conventional charging station in accordance with the prior art.
Figure 1B:
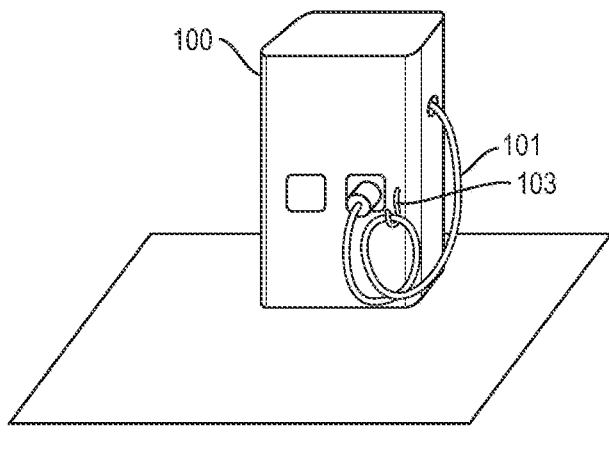
FIG. 1B is a perspective view of a conventional charging station having a hook hanger in accordance with the prior art.
Figure 2A:
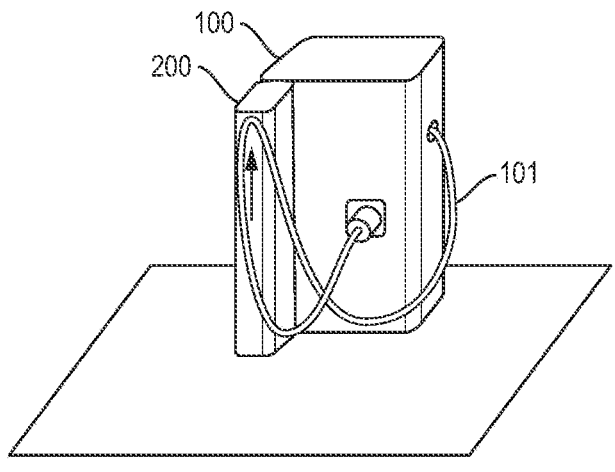
FIG. 2A is a perspective view of a charging station having a conventional linear force retractor in accordance with the prior art.
Figure 2B:
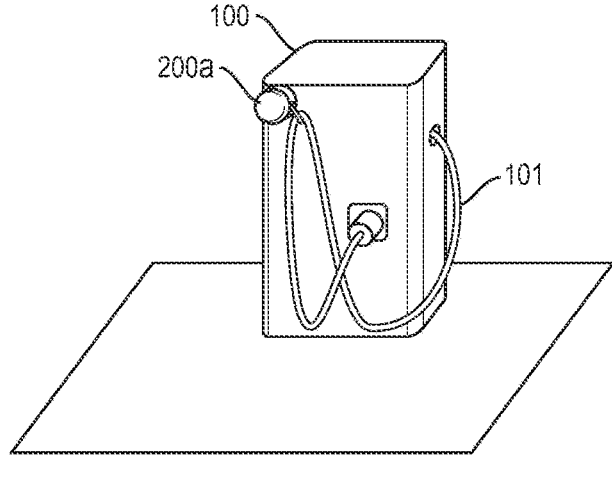
FIG. 2B is a perspective view of a charging station having a conventional rotational force retractor in accordance with the prior art.
Figure 2C:
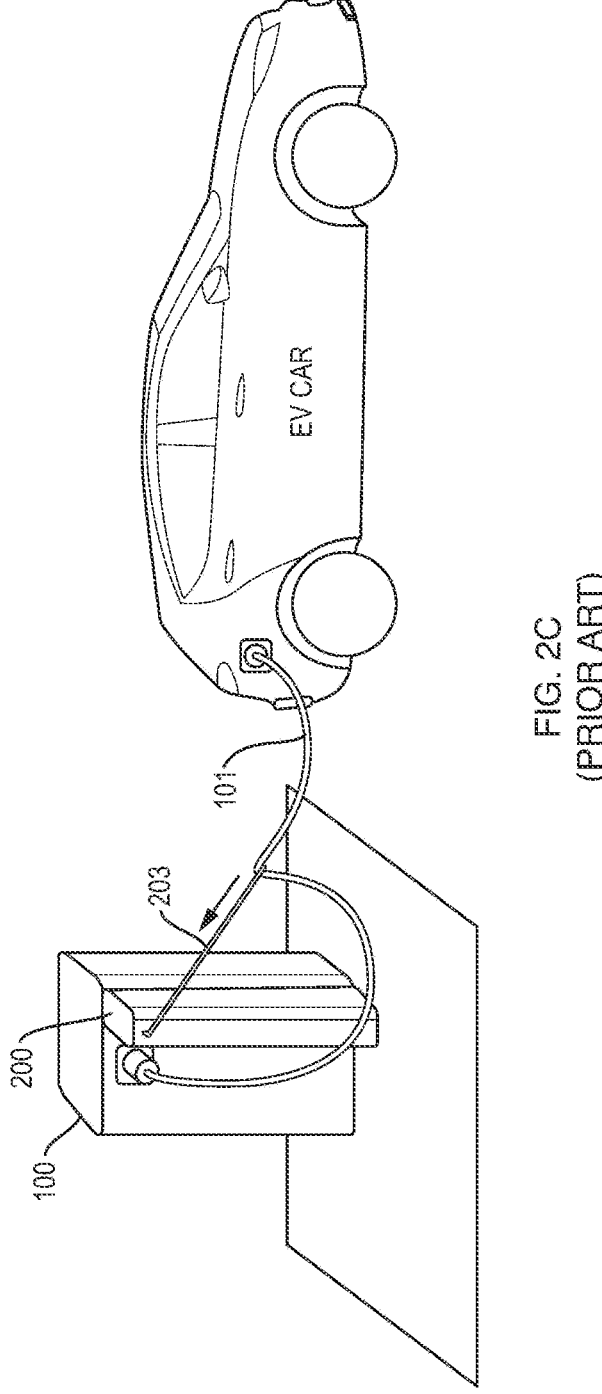
FIG. 2C is a perspective view of the charging station of FIG. 2A wherein a charging cord has been extended in accordance with the prior art.
Figure 3A:
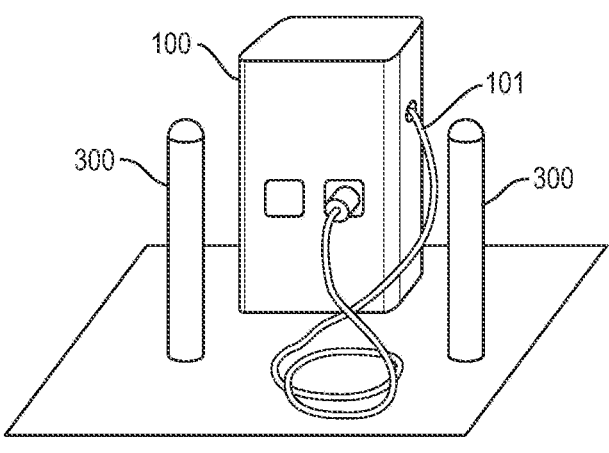
FIG. 3A is a perspective view of a conventional charging station protected by two conventional bollards in accordance with the prior art.
Figure 3B:
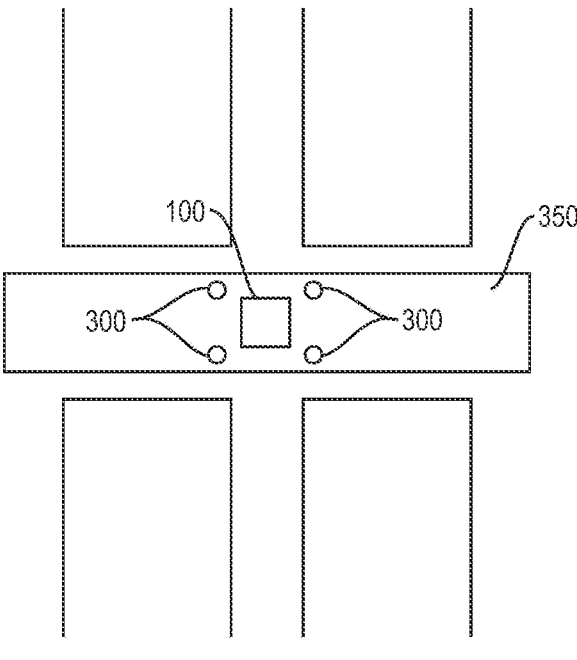
FIG. 3B is a top view of a conventional charging station surrounded by four conventional bollards in accordance with the prior art.
Figure 4A:
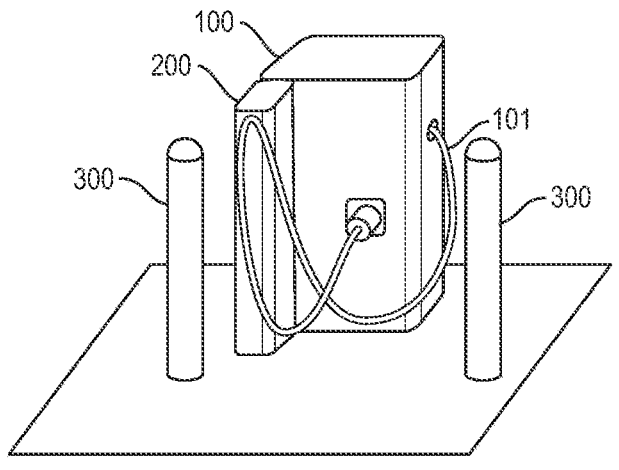
FIG. 4A is a perspective view of the charging station of FIG. 2A protected by two conventional bollards in accordance with the prior art.
Figure 4B:
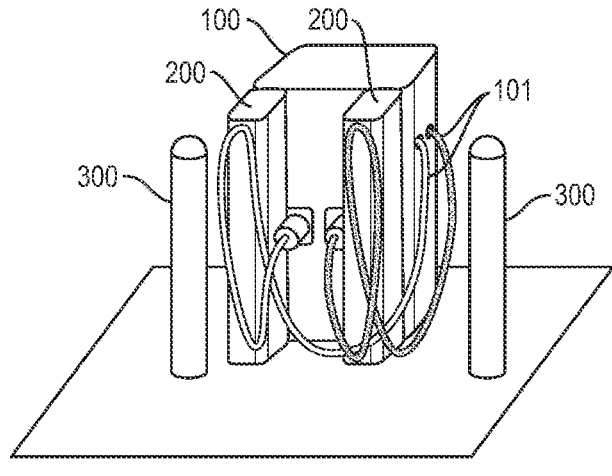
FIG. 4B is a perspective view of a double charging station having conventional retractors and protected by two conventional bollards in accordance with the prior art.
Figure 5A:
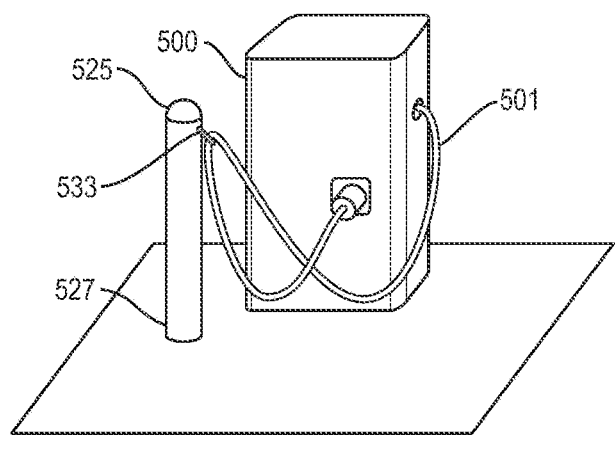
FIG. 5A is a perspective view of a charging station having a bollard cord retractor in accordance with various embodiments.
Figure 5B:
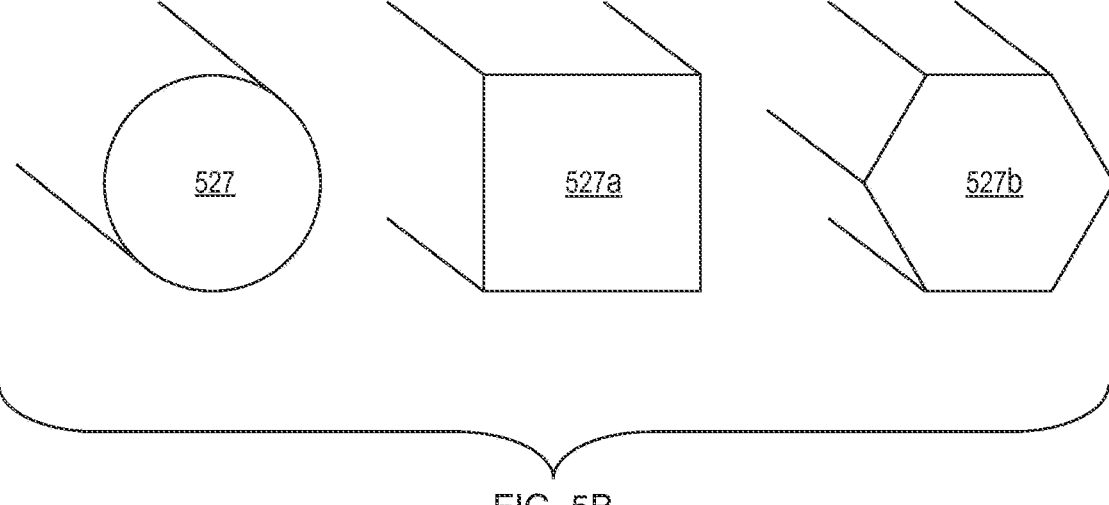
FIG. 5B is a perspective view of a plurality of bollard cross sectional shapes in accordance with various embodiments.
Figure 5C:
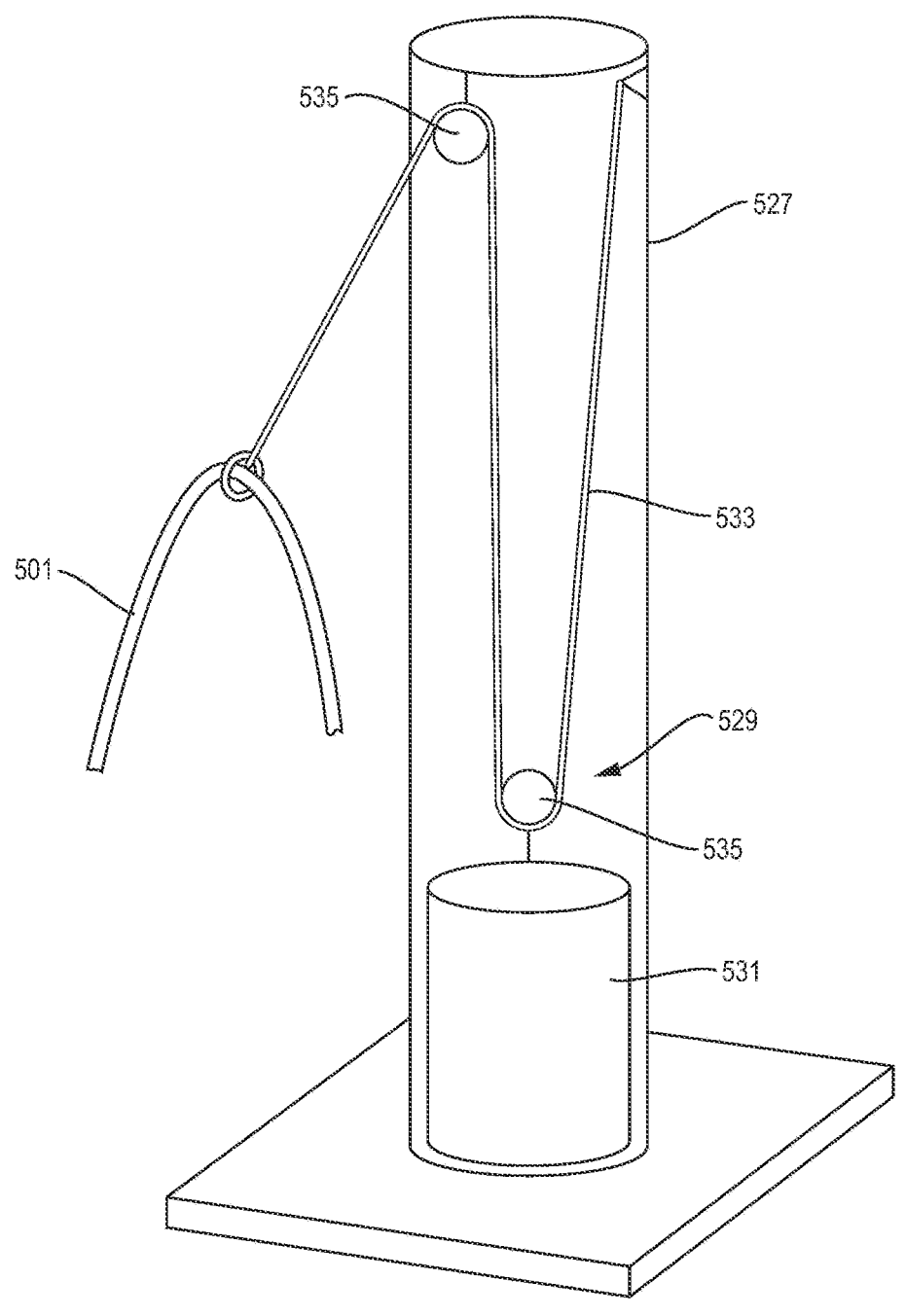
FIG. 5C is a cross sectional view of a bollard cord retractor in accordance with various embodiments.

Referring now to FIGS. 5A-5C, a bollard cord retractor 525 can generally include a bollard 527 for containing or retaining a cord retraction mechanism 529 and be used in connection with a charging station 500 to retract a charging cord 501 thereof. Although generally shown and described herein as including a hollow bollard 527 having a circular cross section, it will be apparent in view of this disclosure that, depending on the configuration of the retraction mechanism, the bollard 527 may be either hollow, solid, or a filled hollow bollard. Furthermore, it will be apparent in view of this disclosure that the bollard can have a cross section of any suitable shape. For example, as shown in FIG. 5B, the bollard 527 can include any one or combination of a circular 527, square 527a, or hexagonal 527b cross section. Other suitable cross sections can be octagonal, rectangular, elliptical, any other hollow cross-sectional shape, or combinations thereof.

Figure 11:
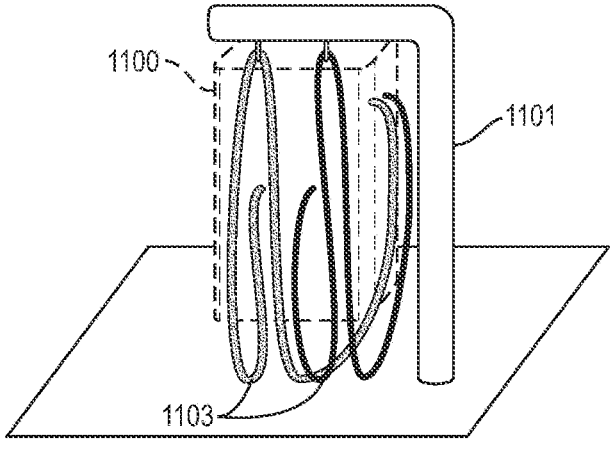
FIG. 11 is a perspective view of a double charging station having a single inverted-L-shaped bollard cord retractor in accordance with various embodiments.

Bollard cord retractors 525 can be configured with any suitable cord retraction mechanism 529 including, for example, linear force retractors such as counterweights or counterweights with pulleys (e.g., as shown in FIGS. 5C and 11), rotational force retractors such as a spring coiler system, an automated or powered system such as electric motor, hydraulic, pneumatic, or magnetic systems, or combinations thereof. For example, as shown in FIG. 5C, a linear force retractor can include a counterweight 531 configured to slide vertically within a hollow bollard 527 in order to facilitate extension and retraction of the charging cord 501 by a retractor line 533 extending over one or more pulleys 535. In such embodiments, when a user pulls the charging cord 501 toward a vehicle, the retractor line 533 extends, pulling the counterweight 531 upward within the bollard 527. Once the user releases or returns the charging cord 501, the counterweight 531 is free to pull downward on the retractor line 533, thereby retracting the charging cord 501 toward the charger 500, away from the associated parking spot, and upward off the ground.

Because the bollard 527 is not attached to or structurally reliant on the charging station 500 itself, the bollard cord retractor 525 can be configured to any desired height corresponding to any desired length of the charging cord 501. For example, providing a bollard 527 significantly taller than the charging station 500 would permit the bollard cord retractor 525 to hold the charger cord 501 at a preferred height such as, for example, a similar height to, or slightly higher than, the charger 500. The ultimate height of the retraction point, of course, may be limited by the length of the cord 501, and/or also limited by an overhead ceiling or structure. Otherwise, the bollard cord retractor 525 has no significant limits on the height of the retraction point.

Furthermore, by combining two features (the bollard 527 and the cord retractor 529) and separating the cord retractor 529 from the charging station 500 itself, the bollard cord retractor 525 drives greater cost efficiency. In particular, because the upright of the cord retractor is incorporated into the bollard, there no longer needs to be an additional retractor housing integrated with or mounted onto the charger. Additionally, such a configuration facilitates a cleaner, more visually appealing design and a simpler, more efficient layout of the cords.

Cord layout is benefitted by the bollard cord retractor in a number of ways. Initially, the bollards are, by virtue of their protective mission, positioned closer to the parking space (and thus the car to be charged) than the charger itself, thereby making easier the operation of undocking the cord, bringing it over to the car, and then back again after charging. Furthermore, by virtue of the charging cord being retracted directly to the bollard, being held higher above the ground, and being positioned closer to the vehicle (and further away from the charger and other cords extending therefrom, bollard cord retractors can also minimize instances of cord tangling, particularly those instances where the cord becomes tangled with or wrapped around a protective bollard.

Figure 6:
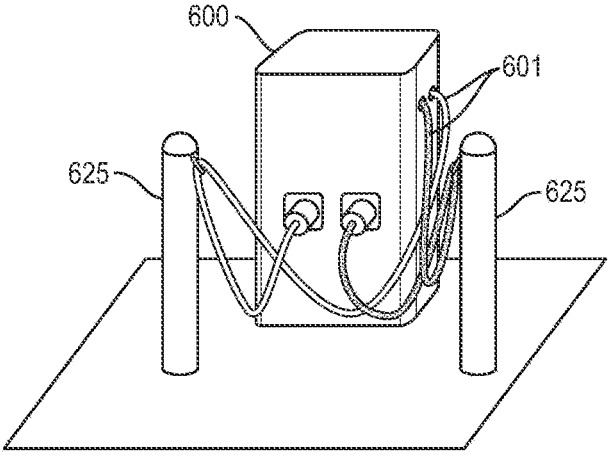
FIG. 6 is a perspective view of a double charging station having two bollard cord retractors in accordance with various embodiments.
Figure 7:
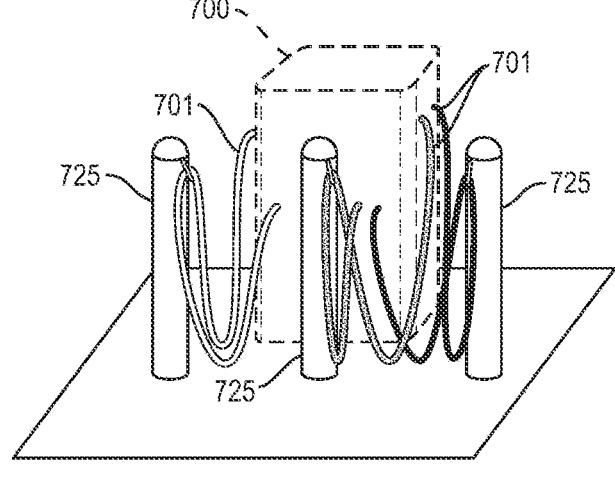
FIG. 7 is a perspective view of a triple charging station having three bollard cord retractors in accordance with various embodiments.

As shown in FIG. 6, in some embodiments one charger 600 can be configured to deliver power to two vehicles via two separate charging cords 601. By use of two bollard cord retractors 625 the cables are further apart and less likely to tangle or interfere with one another. shows a dual cord application of bollard cord retractors. As shown in FIG. 7, chargers 700 can also be configured with three charging cords 701, in which case three cord bollard retractors 725 can be provided. It will furthermore be apparent in view of this disclosure that any number of bollard cord retractors can be used for any number of charging cords in accordance with various embodiments.

Bollard Cord Retractor Variations

Figure 8:
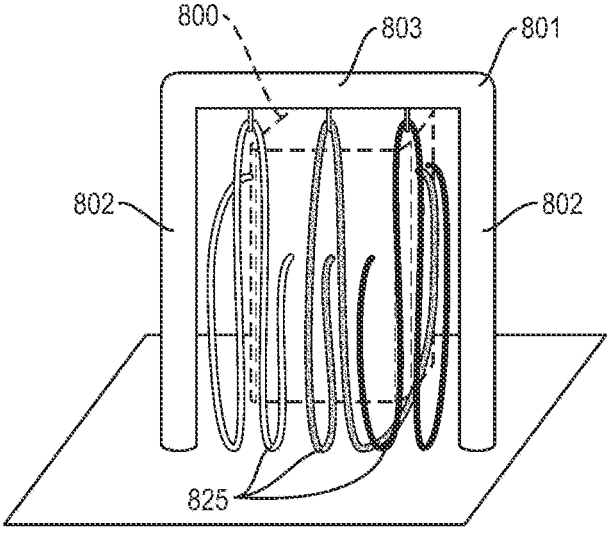
FIG. 8 is a perspective view of a triple charging station having a single horseshoe bollard cord retractor in accordance with various embodiments.

Bollard cord retractors can also be implemented in bollards having any suitable shape in connection with various embodiments. For example, as shown in FIG. 8, one or more chargers 800 can be used in connection with an upside down "U" shaped bollard also known as a horseshoe bollard 801. The horseshoe bollard 800 includes two or more uprights 802 and a horizontal cross member 803. This cross member 803 can be utilized to provide multiple placements for cord retractors. In particular, FIG. 8, for example, depicts a horseshoe bollard 800 retractor system configured for retracting three charging cords 825.

Figure 9:
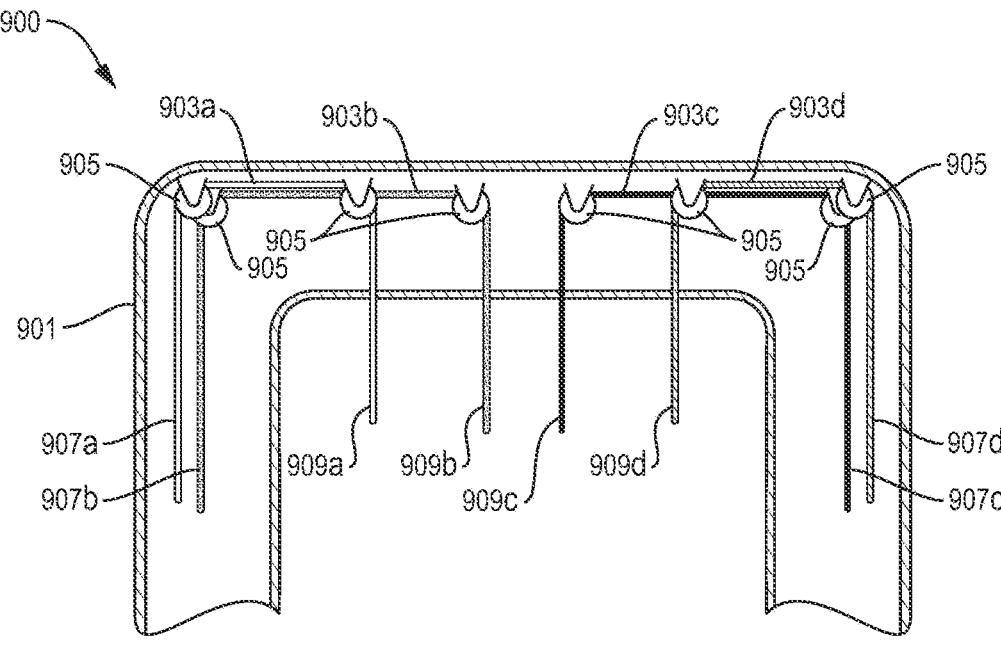
FIG. 9 is a perspective view of a quad charging station having a single horseshoe bollard cord retractor in accordance with various embodiments.

In general, when multiple retractor points are positioned in a single bollard in connection with a multi charger cord configuration, it may be advantageous to use a multiple pulley arrangement. Referring now to FIG. 9, a cross sectional view of a four-cord retractor system 900 in a horseshoe bollard 901 is provided. Such multiple pulley arrangements can include one or more pulley and counterweight systems on each side of the horseshoe bollard 901. For example, in the embodiment shown in FIG. 9, two counterweights (not shown) can be positioned on each side of the horseshoe such that each of the four (4) counterweights is operatively connected at a respective internal counterweighted end 907a, 907b, 907c, 907d of each retractor line 903a, 903b, 903c, 903d, wherein each retractor line 903a, 903b, 903c, 903d is run over one or more pulleys 905 within the bollard 901 and extends out of a horizontal crossmember of the bollard 901 to engage one of four (4) charging cords (not shown) at an external charging cord end 909a, 909b, 909c, 909d of the respective retractor line 903a, 903b, 903c, 903d.

Figure 10:
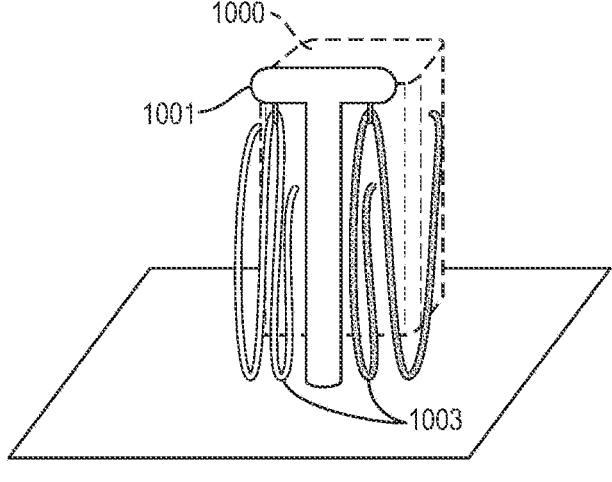
FIG. 10 is a perspective view of a double charging station having a single T-shaped bollard cord retractor in accordance with various embodiments.

It will further be apparent in view of this disclosure that any bollard configuration can be used in accordance with various embodiments for retracting any number of charging cords. For example, as shown in FIG. 10, a two-cord retractor configuration 1000 can utilize a 'T' shaped bollard 1001 for retracting two charging cords 1003. Alternatively, as shown in FIG. 11, a two-cord retractor configuration 1100 can utilize an upside down 'L' shaped bollard 1101 for retracting two charging cords 1103. Furthermore, any suitable shape can be used in accordance with various embodiments. In particular, shapes that provide a high pick-up point or cross member.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above-described embodiments and examples.

Having described the invention, and a preferred embodiment thereof, what is claimed as new and secured by letters patent is:

What is claimed is:

1. A bollard cord retractor comprising:
   a bollard having a hollow cavity extending through at least a portion thereof;

a force retractor positioned within the hollow cavity, the force retractor including a linear force retractor; and
   a retraction line attached at a first end to the force retractor and attached at a second end to a charging cord of a charger,
   wherein the bollard is separate and spaced apart from the charger.

2. The bollard cord retractor of claim 1, further comprising at least one pulley configured to redirect a force exerted on the retraction line by the force retractor.

3. The bollard cord retractor of claim 1, wherein the linear force retractor includes a counterweight configured to slide vertically within the hollow cavity, the retraction line attached at the first end to the counterweight.

4. A charging system comprising:
   an electric charging station having a charging cord; and
   a bollard cord retractor including:
      a bollard separate and spaced apart from the electric charging station, the bollard having a hollow cavity extending through at least a portion thereof;
      a force retractor positioned within the hollow cavity, the force retractor including a linear force retractor; and
      a retraction line attached at a first end to the force retractor and attached at a second end to the charging cord of the electric charging station.

5. The charging system of claim 4, wherein the bollard is at least one of a single vertical column bollard, a horseshoe bollard, a T bollard, or an upside down L bollard.

6. The charging system of claim 4, wherein the bollard is taller than the electric charging station.

7. The charging system of claim 4, further comprising:
   at least one additional charging cord of the electric charging station; and
   at least one additional bollard cord retractor, each of the at least one additional bollard cord retractors including:
      an additional bollard separate and spaced apart from the electric charging station, the additional bollard having an additional hollow cavity extending through at least a portion thereof;
      an additional force retractor positioned within the additional hollow cavity, the additional force retractor including a linear force retractor; and
      an additional retraction line attached at a first end to the additional force retractor and attached at a second end to the additional charging cord of the electric charging station.

8. The charging system of claim 4, further comprising at least one additional charging cord of the electric charging station;
   wherein the bollard cord retractor further comprises:
      an additional force retractor positioned within the hollow cavity, the additional force retractor including a linear force retractor; and
      an additional retraction line attached at a first end to the additional force retractor and attached at a second end to the additional charging cord of the electric charging station.

9. The charging system of claim 8, further comprising:
   at least one pulley positioned inside the hollow cavity to redirect a force exerted on the retraction line by the force retractor; and
   at least one additional pulley positioned inside the hollow cavity to redirect a force exerted on the additional retraction line by the additional force retractor.

10. The charging system of claim 9, wherein:

the force retractor includes a counterweight configured to slide vertically within the hollow cavity, the retraction line attached at the first end to the counterweight; and the additional force retractor includes an additional counterweight configured to slide vertically within the hollow cavity, the additional retraction line attached at the first end to the additional counterweight.

11. The charging system of claim 10, wherein the counterweight and the additional counterweight are positioned in the hollow cavity in a same vertical column of the bollard.

12. The charging system of claim 11, wherein the bollard is at least one of a single vertical column bollard, a T bollard, a horseshoe bollard, or an upside-down L bollard.

13. The charging system of claim 10, wherein the bollard is a horseshoe bollard having a first vertical column, a second vertical column, and a horizontal cross-bar.

14. The charging system of claim 13, wherein:

the counterweight is positioned in the hollow cavity in the first vertical column; and the additional counterweight is positioned in the hollow cavity in the second vertical column.

15. The charging system of claim 14, wherein:

the retraction line extends from the counterweight through the first vertical column, over the pulley, at least partially through the horizontal cross-bar, and through a wall of the horizontal cross-bar to attach to the charging cord between the first and second vertical columns; and the additional retraction line extends from the additional counterweight through the second vertical column, over the additional pulley, at least partially through the horizontal cross-bar, and through the wall of the horizontal cross-bar to attach to the additional charging cord between the first and second vertical columns.

* * * * *